United States Patent
Du et al.

(10) Patent No.: US 12,056,790 B2
(45) Date of Patent: Aug. 6, 2024

(54) METHODS AND APPARATUS TO FACILITATE A DEDICATED BINDLESS STATE PROCESSOR

(71) Applicant: QUALCOMM Incorporated, San Diego, CA (US)

(72) Inventors: Yun Du, San Diego, CA (US); Andrew Evan Gruber, Arlington, MA (US); Chun Yu, Rancho Santa Fe, CA (US); Chihong Zhang, San Diego, CA (US); Thomas Edwin Frisinger, Shrewsbury, MA (US); Richard Hammerstone, Tyngsboro, MA (US); Zilin Ying, San Diego, CA (US); Heng Qi, Shanghai (CN); Quanquan Xu, San Diego, CA (US); Sheng Gu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 181 days.

(21) Appl. No.: 17/758,219

(22) PCT Filed: Jan. 31, 2020

(86) PCT No.: PCT/CN2020/074108
§ 371 (c)(1),
(2) Date: Jun. 29, 2022

(87) PCT Pub. No.: WO2021/151248
PCT Pub. Date: Aug. 5, 2021

(65) Prior Publication Data
US 2023/0019763 A1 Jan. 19, 2023

(51) Int. Cl.
*G06T 1/60* (2006.01)

(52) U.S. Cl.
CPC .................................. *G06T 1/60* (2013.01)

(58) Field of Classification Search
CPC .................................. G06T 1/60; G06T 1/20
See application file for complete search history.

(56) References Cited

U.S. PATENT DOCUMENTS

| 8,094,158 | B1 | 1/2012 | Allen et al. |
| 9,251,551 | B2 * | 2/2016 | Hall ......................... G06T 1/20 |
| 9,799,094 | B1 | 10/2017 | Chen et al. |
| 10,997,086 | B1 * | 5/2021 | Ray ..................... G06F 12/1072 |

(Continued)

OTHER PUBLICATIONS

International Search Report and Written Opinion—PCT/CN2020/074108—ISA/EPO—Nov. 6, 2020.

*Primary Examiner* — Motilewa Good-Johnson
(74) *Attorney, Agent, or Firm* — Arent Fox, LLP

(57) ABSTRACT

The present disclosure relates to methods and apparatus for graphics processing. For example, disclosed techniques facilitate improving bindless state processing at a graphics processor. Aspects of the present disclosure can receive, at a graphics processor, a shader program including a preamble section and a main instructions section. Aspects of the present disclosure can also execute, with a scalar processor dedicated to processing preamble sections, instructions of the preamble section to implement a bindless mechanism for loading constant data associated with the shader program. Additionally, aspects of the present disclosure can distribute the main instructions section and the constant data to a streaming processor for executing the shader program.

18 Claims, 9 Drawing Sheets

(56) References Cited

U.S. PATENT DOCUMENTS

| | | | |
|---|---|---|---|
| 11,422,969 B2* | 8/2022 | Manglani | G06F 9/30123 |
| 2006/0082577 A1 | 4/2006 | Carter | |
| 2017/0263044 A1 | 9/2017 | Peterson et al. | |
| 2018/0165786 A1* | 6/2018 | Bourd | G06T 1/20 |

* cited by examiner

METHODS AND APPARATUS TO FACILITATE A DEDICATED BINDLESS STATE PROCESSOR

CROSS REFERENCE TO RELATED APPLICATION(S)

This application is a National Phase entry of PCT Application No. PCT/CN2020/074108, entitled "METHODS AND APPARATUS TO FACILITATE A DEDICATED BINDLESS STATE PROCESSOR" and filed on Jan. 31, 2020, which is expressly incorporated by reference herein in its entirety.

TECHNICAL FIELD

The present disclosure relates generally to processing systems and, more particularly, to one or more techniques for graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be an application processor, a CPU, a GPU, a general-purpose GPU (GPGPU), a display processor, a display processing unit (DPU), or a video processor. The apparatus can receive, at a graphics processor, a shader program including a preamble section and a main instructions section. The apparatus can also execute, with a scalar processor dedicated to processing preamble sections, instructions of the preamble section to implement a bindless mechanism for loading constant data associated with the shader program. The apparatus can also distribute the main instructions section and the constant data to a streaming processor for executing the shader program. In some examples, the apparatus can also employ a same instruction set architecture (ISA) at the scalar processor and the streaming processor. In some examples, the shader program may include an indicator indicating whether the scalar processor or the streaming processor is to execute the instructions of the preamble section. In some examples, the scalar processor may be configured to execute a subset of functions of the streaming processor. In some examples, the apparatus can also implement the bindless mechanism during runtime. In some examples, the apparatus can also load a first subset of data from a first buffer. In some examples, the apparatus can also load a second subset of data from a second buffer. In some examples, the apparatus can also concatenate the first subset of data and the second subset of data into a third buffer. In some examples, the third buffer may include the constant data. In some examples, the apparatus can also fetch the instructions of the preamble section from a buffer. In some examples, the apparatus can also decode the instructions of the preamble section. In some examples, the apparatus can also fetch one or more operands for executing the instructions of the preamble section. In some examples, the apparatus can also perform flow control for the executing of the instructions of the preamble section. In some examples, the apparatus can also execute the instructions of the preamble section based on the flow control. In some examples, the apparatus can also store output data generated by the executing of the instructions of the preamble section at the buffer.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
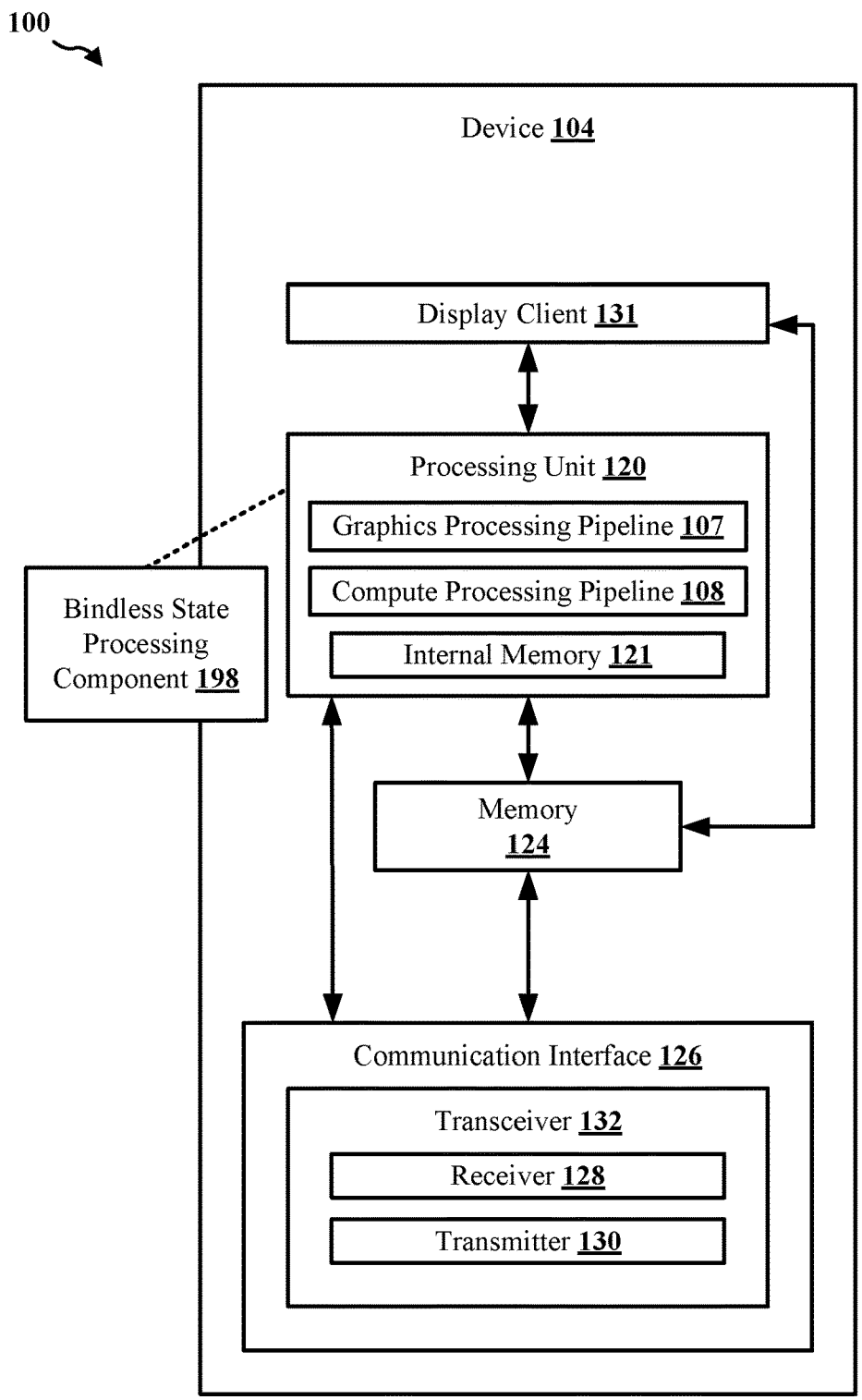
FIG. 1 is a block diagram that illustrates an example content generation system, in accordance with one or more techniques of this disclosure.

Example techniques disclosed herein facilitate performing processing of bindless resources at a graphics processor using scalar processing. In particular, disclosed techniques may be implemented by processor-based devices that utilize parallel processing units, such graphics processors, that are configured to perform many operations in parallel (e.g., at the same time or at nearly the same time). For example, a graphics processor may include one or more processor cores (e.g., streaming processors) that execute instructions for one or more programs (sometimes referred to as "shader programs" or "shaders"). Although the following description provides examples for implementing one or more disclosed techniques with a GPU, the concepts described herein may be applicable to other processor-based devices that employ parallel processing units and/or non-parallel processing units (e.g., a processing unit configured to perform parallel processing).

In some examples, the graphics processor may be implemented with a single instruction, multiple data (SIMD) structure. In the SIMD structure, a streaming processor (sometimes referred to as a "shader processor") includes a plurality of processing elements that execute instructions of a same program but with different data. In some examples, particular instructions executing on a particular processing element may be referred to as a "fiber" or a "thread." Thus, while different processing elements of the streaming processor may be considered as performing different fibers, the different processing elements may still be performing the same particular instructions. In this manner, the SIMD structure enables a graphics processor to perform many tasks in parallel (e.g., at the same time or at nearly the same time).

In general, example techniques disclosed herein facilitate improving the processing of bindless resources (e.g., resources requested at runtime). For example, a graphics processor may include a high-level sequencer (HLSQ) and one or more streaming processors. The HLSQ may be configured to facilitate receiving a shader program including a preamble section and a main instructions section. In a graphics processing example, the shader program may include a draw command that executes on a plurality of work items (e.g., pixels or vertices). In some such examples, the preamble section may be executed once per draw command and the main instructions section may be executed once per work item (e.g., once per pixel or once per vertex). Thus, it may be appreciated that for a shader program, the preamble section of the shader program will be executed at a different (e.g., lower) frequency than the main instructions section. The one or more streaming processors may be configured to execute the shader program. In some examples, the HLSQ may facilitate preparing the context states of a streaming processor and providing resources to the streaming processor for executing the shader program. Example techniques disclosed herein employ a bindless state processor (BSP) with the HLSQ to prepare the resources before providing the resources to the streaming processor. In some examples, the BSP may be a processor dedicated to the executing of instructions to load bindless resources. For example, the BSP may execute the instructions of the preamble section of the shader program to load the constant data for a respective context state of the steaming processor. The BSP may store the constant data in a buffer of the HLSQ. After the instructions of the preamble section are complete and the respective constant data is stored at the buffer, the HLSQ may then broadcast (e.g., distribute) the constant data and the main instructions section of the shader program to the one or more streaming processors for executing the shader program.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as "processing units"). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, such as software, being configured to perform one or more functions. In such examples, the application may be stored on a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, examples disclosed herein provide techniques for improving performance of operations in a graphics processor. Example techniques may improve the performance of executing shader programs with the graphics processor by enabling efficient loading of bindless resources (e.g., a bindless constant buffer) that may be accessed during execution of the shader program and/or reduce the load of a processing unit (e.g., any processing unit configured to perform one or more techniques disclosed herein, such as a GPU, an application processor, a CPU, a display processor, a DPU, and the like). For example, this disclosure describes techniques for graphics processing in any device that uses hardware to facilitate the loading of bindless resources. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to content produced by one or more processes of a graphics processing pipeline. In some examples, as used herein, the term "graphical content" may refer to content produced by a processing unit configured to perform graphics processing. In some examples, as used herein, the term "graphical content" may refer to content produced by a graphics processor. In some examples, as used herein, a graphics processor may be any device capable of processing graphics content (e.g., an application processor, a CPU, a display processor, a DPU, and the like) and/or any device designed to perform graphics processing (e.g., a GPU). In some examples, as used herein, the term "display content" may refer to content generated by a processing unit configured to perform display processing. In some examples, as used herein, the term "display content" may refer to content generated by a display processing unit. Graphical content may be processed to become display content. For example, a graphics processor may output graphical content, such as a frame, to a buffer (which may be referred to as a "framebuffer"). A display processor (or a DPU) may read the graphical content, such as one or more frames from the buffer, and perform one or more display processing techniques thereon to generate display content. For example, a display processor may be configured to perform composition on one or more rendered layers to generate a frame. As another example, a display processor may be configured to compose, blend, or otherwise combine two or more layers together into a single frame. A display processor may be configured to perform scaling (e.g., upscaling or downscaling) on a frame. In some examples, a frame may refer to a layer. In some examples, a frame may refer to two or more layers that have already been blended together to form the frame (e.g., the frame includes two or more layers), and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 includes a processing unit 120 and a memory 124. In some examples, the device 104 can include a number of additional or alternative components, such as a communication interface 126, a transceiver 132, a receiver 128, a transmitter 130, and a display client 131.

The processing unit 120 may include an internal memory 121. The processing unit 120 may be configured to perform graphics processing, such as in a graphics processing pipeline 107. Example implementations of the graphics processing pipeline 107 may facilitate rendering (or drawing) graphical content to a display, such as the example display client 131. In some examples, the processing unit 120 may additionally or alternatively be configured to perform non-graphics processing, such as in a compute processing pipeline 108. Example implementations of the compute processing pipeline 108 may facilitate performing general-purpose operations or non-graphical operations, such as machine learning operations.

In some examples, the processing unit 120 may include a display processor to perform one or more display processing techniques on one or more frames generated by the processing unit 120 before presentment of the generated frame(s) by the display client 131. The display processor may be configured to perform display processing. For example, the display processor may be configured to perform one or more display processing techniques on one or more frames generated by the processing unit 120. The display processor may output image data to the display client 131 according to an interface protocol, such as, for example, the MIPI DSI (Mobile Industry Processor Interface, Display Serial Interface).

The display client 131 may be configured to display or otherwise present frames processed by the processing unit 120 (and/or the display processor). In some examples, the display client 131 may include one or more of: a liquid crystal display (LCD), a plasma display, an organic light emitting diode (OLED) display, a projection display device, an augmented reality display device, a virtual reality display device, a head-mounted display, or any other type of display device.

Reference to the display client 131 may refer to one or more displays. For example, the display client 131 may include a single display or multiple displays. The display client 131 may include a first display and a second display. In further examples, the results of the graphics processing may not be displayed on the device. For example, the display(s) may not receive any frames for presentment thereon. Instead, the frames or graphics processing results may be transferred to another device. In some examples, the transferring of the frames or graphics processing results to another device can be referred to as split-rendering.

As disclosed above, the display client 131 may be configured in accordance with MIPI DSI standards. The MIPI DSI standards support a video mode and a command mode. In examples in which the display client 131 is operating in the video mode, the processing unit 120 (and/or the display processor) may continuously refresh the graphical content of the display client 131. For example, the entire graphical content of a frame may be refreshed per refresh cycle (e.g., line-by-line).

In examples in which the display client 131 is operating in the command mode, the processing unit 120 (and/or the display processor) may write the graphical content of a frame to a buffer. In some examples, the display client 131 may include the buffer and, thus, the buffer may represent memory local to the display client 131. In some such examples, the processing unit 120 (and/or the display processor) may not continuously refresh the graphical content of the display client 131. Instead, the processing unit 120 (and/or the display processor) may use a vertical synchronization (Vsync) pulse to coordinate rendering and consuming of graphical content at the buffer. For example, when a Vsync pulse is generated, the processing unit 120 (and/or the display processor) may output new graphical content to the buffer. Thus, the generating of the Vsync pulse may indicate when current graphical content at the buffer has been rendered.

Memory external to the processing unit 120, such as memory 124, may be accessible to the processing unit 120, the display client 131, and/or the communication interface 126. For example, the processing unit 120 may be configured to read from and/or write to external memory, such as the memory 124. The processing unit 120, the display client 131, and/or the communication interface 126 may be communicatively coupled to the memory 124 over a bus. In some examples, the processing unit 120, the memory 124, the communication interface 126, and/or the display client 131 may be communicatively coupled to each other over the bus or a different connection.

In some examples, the device 104 may include a content encoder/decoder configured to receive graphical and/or display content from any source, such as the memory 124 and/or the communication interface 126. The memory 124 may be configured to store received encoded content or decoded content. In some examples, the content encoder/decoder may be configured to receive encoded content or decoded content (e.g., from the memory 124 and/or the communication interface 126) in the form of encoded pixel data or decoded pixel data. In some examples, the content encoder/decoder may be configured to encode or decode any content.

The internal memory 121 and/or the memory 124 may include one or more volatile or non-volatile memories or storage devices. In some examples, the internal memory 121 and/or the memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 and/or the memory 124 may be a non-transitory storage medium according to some examples. The term "non-transitory" may indicate that the storage medium is not embodied in a carrier wave or a propagated signal. However, the term "non-transitory" should not be interpreted to mean that the internal memory 121 and/or the memory 124 is non-movable or that its contents are static. As one example, the memory 124 may be removed from the device 104 and moved to another device. As another example, the memory 124 may not be removable from the device 104.

The processing unit 120 may be a CPU, an application processor, a GPU, a general purpose GPU (GPGPU), a DPU, a display processor, or any other processing unit that may be configured to perform graphics processing and/or non-graphics processing (e.g., compute processing). In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, CPUs, application processors, GPUs, DPUs, display processors, image signal processors (ISPs), application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium (e.g., the internal memory 121), and may execute the instructions in hardware using one or more processors to perform the techniques of this disclosure. Any of the foregoing, including hardware, software, a combination of hardware and software, etc., may be considered to be one or more processors.

In some examples, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information (e.g., eye or head position information, rendering commands, or location information) from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

In some examples, the graphical content from the processing unit 120 for display via the display client 131 may not be static and may be changing. Accordingly, the processing unit 120 (and/or the display processor) may periodically refresh the graphical content displayed by the display client 131. For example, the processing unit 120 (and/or the display processor) may periodically retrieve graphical content from the memory 124, where the graphical content may have been updated by the execution of an application (and/or the processing unit 120) that outputs the graphical content to the memory 124.

Referring again to FIG. 1, in some aspects, the processing unit 120 may be configured to operate one or more techniques disclosed herein. For example, the processing unit 120 may include a bindless state processing component 198 configured to receive, at a graphics processor, a shader program including a preamble section and a main instructions section. The bindless state processing component 198 may also be configured to execute, with a scalar processor dedicated to processing preamble sections, instructions of the preamble section to implement a bindless mechanism for loading constant data associated with the shader program. The bindless state processing component 198 may also be configured to distribute the main instructions section and the constant data to a streaming processor for executing the shader program. The bindless state processing component 198 may also be configured to employ a same instruction set architecture (ISA) at the scalar processor and the streaming processor. The bindless state processing component 198 may also be configured to implement the bindless mechanism during runtime. The bindless state processing component 198 may also be configured to load a first subset of data from a first buffer. The bindless state processing component 198 may also be configured to load a second subset of data from a second buffer. The bindless state processing component 198 may also be configured to concatenate the first subset of data and the second subset of data into a third buffer. The bindless state processing component 198 may also be configured to fetch the instructions of the preamble section from a buffer. The bindless state processing component 198 may also be configured to decode the instructions of the preamble section. The bindless state processing component 198 may also be configured to fetch one or more operands for executing the instructions of the preamble section. The bindless state processing component 198 may also be configured to perform flow control for the executing of the instructions of the preamble section. The bindless state processing component 198 may also be configured to execute the instructions of the preamble section based on the flow control. The bindless state processing component 198 may also be configured to store output data generated by the executing of the instructions of the preamble section at the buffer.

As described herein, a device, such as the device 104, may refer to any device, apparatus, or system configured to perform one or more techniques described herein. For example, a device may be a server, a base station, user equipment, a client device, a station, an access point, a computer (e.g., a personal computer, a desktop computer, a laptop computer, a tablet computer, a computer workstation, or a mainframe computer), an end product, an apparatus, a phone, a smart phone, a server, a video game platform or console, a handheld device (e.g., a portable video game device or a personal digital assistant (PDA)), a wearable computing device (e.g., a smart watch, an augmented reality device, or a virtual reality device), a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., an application processor or a CPU), consistent with disclosed embodiments.

Graphics processors can process multiple types of data or data packets in a graphics pipeline. For instance, in some examples, a graphics processor can process two types of data or data packets (e.g., context register packets and draw call data). A context register packet can be a set of global state information (e.g., information regarding a global register, a shader program, or constant data) that can regulate how a graphics context will be processed. For example, a context register packet can include information regarding a color format. In some examples, a context register packet may include a bit that indicates which workload belongs to a context register. Also, there can be multiple functions or programming running at the same time and/or in parallel. For example, functions or programming can describe a certain operation (e.g., the color mode or color format). Accordingly, a context register can define multiple states of a graphics processor.

Context states can be utilized to determine how an individual processing unit functions (e.g., a vertex fetcher (VFD), a vertex shader (VS), a shader processor, or a geometry processor), and/or in what mode the processing unit functions. In order to do so, graphics processors can use, for example, context registers and programming data. In some examples, a graphics processor can generate a workload (e.g., a vertex workload or a pixel workload) in the pipeline based on the context register definition of a mode or state. Certain processing units (e.g., a VFD) can use these states to determine certain functions, such as how a vertex is assembled. As these modes or states can change, a graphics processor can change the corresponding context. Additionally, the workload that corresponds to the mode or state may follow the changing mode or state (e.g., the workload may be received after the mode or state is changed).

Figure 2:
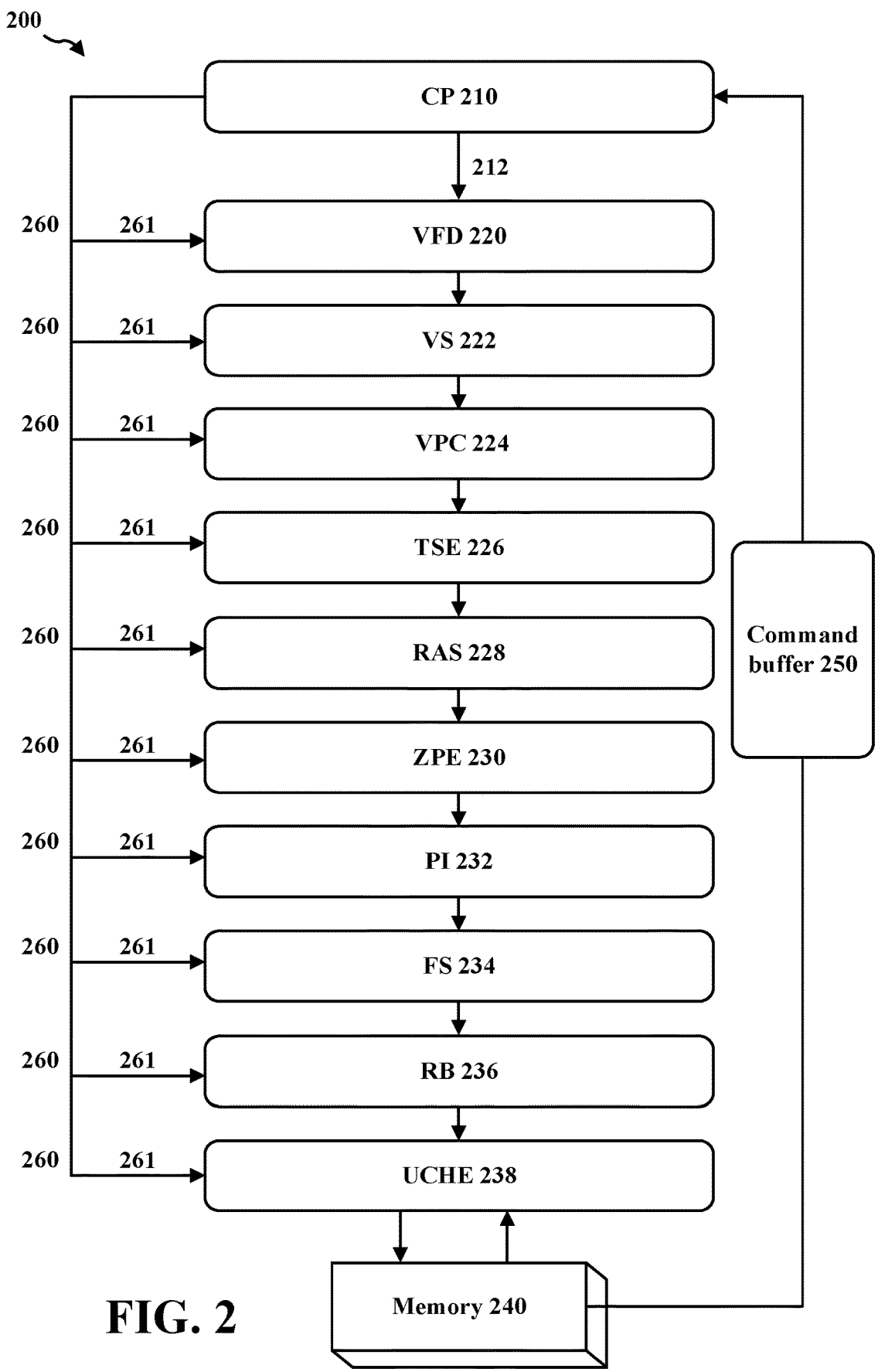
FIG. 2 illustrates an example graphics processor, in accordance with one or more techniques of this disclosure.

FIG. 2 illustrates an example graphics processor 200, in accordance with one or more techniques of this disclosure. As shown in FIG. 2, the graphics processor 200 includes a command processor (CP) 210, draw call packets 212, a VFD 220, a VS 222, a vertex cache (VPC) 224, a triangle setup engine (TSE) 226, a rasterizer (RAS) 228, a Z process engine (ZPE) 230, a pixel interpolator (PI) 232, a fragment shader (FS) 234, a render backend (RB) 236, an L2 cache (UCHE) 238, and memory 240. Although FIG. 2 displays that the graphics processor 200 includes the processing units 220 to 238, the graphics processor 200 can include a number of additional and/or alternative processing units. Additionally, the processing units 220 to 238 are merely an example and any combination or order of processing units can be used by graphics processors according to the present disclosure. The example graphics processor 200 also includes a command buffer 250, context register packets 260, and context states 261.

As shown in FIG. 2, a graphics processor can utilize a CP (e.g., the CP 210 or a hardware accelerator) to parse a command buffer into context register packets (e.g., the context register packets 260) and/or into draw call data packets (e.g., the draw call packets 212). The CP 210 can then send the context register packets 260 or draw call data packets 212 through separate paths to the processing units or blocks in the graphics processor. Further, the command buffer 250 can alternate different states of context registers and draw calls. For example, a command buffer can be structured in the following manner: context register of context N, draw call(s) of context #N, context register of context #N+1, and draw call(s) of context #N+1.

In some aspects, for each graphics processor processing unit or block, a context register may need to be prepared before any draw call data can be processed. As context registers and draw calls can be serialized, it can be helpful to have an extra context register prepared before the next draw call. In some instances, draw calls of the next context can be fed through the graphics processor data pipeline in order to hide context register programming latency. Further, when a graphics processor is equipped with multiple sets of context registers, each processing unit can have sufficient context switching capacity to manage smooth context processing. In turn, this can enable the graphics processor to cover pipeline latency that can result from unpredictable memory access latency and/or extended processing pipeline latency.

Figure 3:
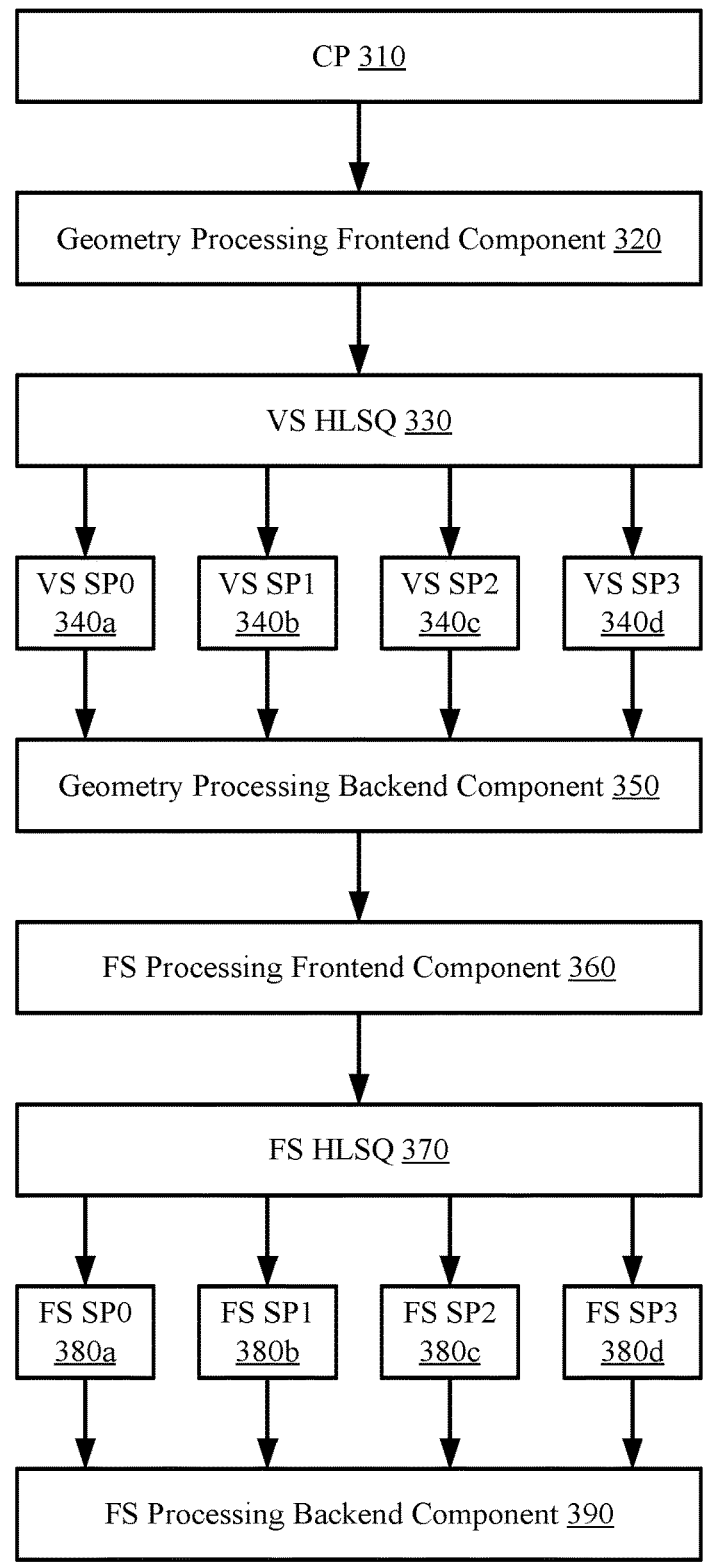
FIG. 3 illustrates an example implementation of a graphics processor executing aspects of a graphics processing pipeline, in accordance with one or more techniques of this disclosure.

FIG. 3 illustrates an example implementation of a graphics processor 300 executing aspects of a graphics processing pipeline, in accordance with one or more techniques of this disclosure. In some examples, one or more aspects of the graphics processor 300 may be implemented by the processing unit 120 of FIG. 1 and/or the graphics processor 200 of FIG. 2. In some examples, one or more aspects of the graphics processing pipeline of FIG. 3 may be implemented by the graphics processing pipeline 107 of FIG. 1.

As shown in FIG. 3, the graphics processor 300 includes a command processor (CP) 310, a geometry processing frontend component 320, a vertex shader (VS) high-level sequencer (HLSQ) 330, VS streaming processors 340a, 340b, 340c, 340d (collectively referred to herein as VS streaming processors 340), a geometry processing backend component 350, a fragment shader (FS) processing frontend component 360, an FS HLSQ 370, FS streaming processors 380a, 380b, 380c, 380d (collectively referred to herein as FS streaming processors 380), and an FS processing backend component 390. Although the example graphics processor 300 of FIG. 3 includes four VS streaming processors 340 and four FS streaming processors 380, additional or alternative examples of the graphics processor may include other suitable quantities of VS streaming processors 340 and/or FS streaming processors 380.

The command processor 310 may be configured to receive a command stream representing operations for the graphics processor 300 to perform. The geometry processing frontend component 320 may be configured to perform frontend operations related to geometry processing of the graphics processing pipeline. For example, the geometry processing frontend component 320 may be configured to prepare a vertex workload for processing by the graphics processing pipeline (e.g., the geometry processing frontend component 320 may fetch graphics data, such as vertex data, primitives, attributes, etc., from, for example, a memory, such as the memory 124 and/or the internal memory 121 of FIG. 1). In some examples, one or more aspects of the geometry processing frontend component 320 may be implemented by the VFD 220 of FIG. 2.

The VS HLSQ 330 may be configured to receive the vertex workloads and to distribute the vertex workloads to one or more of the VS streaming processors 340. In some examples, the VS HLSQ 330 may prepare the context and resources for the respective VS streaming processors 340 based on the vertex workloads. The VS streaming processors 340 may be configured to execute vertex shader programs to process the received vertex workload(s). In some examples, one or more aspects of the VS streaming processors 340 may be implemented by the VS 222 of FIG. 2.

The geometry processing backend component 350 may be configured to perform further processing on vertices output by the VS streaming processors 340. For example, the geometry processing backend component 350 may be configured to perform edge coefficient calculations, shadow volume extrusion, etc. and/or storing the processed vertex data in memory (e.g., in a vertex cache). In some examples, one or more aspects of the geometry processing backend component 350 may be implemented by the VPC 224 of FIG. 2.

The FS processing frontend component 360 may be configured to perform frontend operations related to fragment shader processing of the graphics processing pipeline. For example, the FS processing frontend component 360 may be configured to prepare fragment shader workloads for processing by the graphics processing pipeline (e.g., the FS processing frontend component 360 may setup triangles, tiles, etc.). In some examples, one or more aspects of the FS processing frontend component 360 may be implemented by the TSE 226, the RAS 228, the ZPE 230, and/or the PI 232 of FIG. 2.

The FS HLSQ 370 may be configured to receive the fragment shader workloads and to distribute the fragment shader workloads to one or more of the FS streaming processors 380. In some examples, the FS HLSQ 370 may prepare the context and resources for the respective FS streaming processors 380 based on the fragment shader workloads. The FS streaming processors 380 may be configured to execute fragment shader programs to process the distributed fragment shader workloads. In some examples, one or more aspects of the FS streaming processors 380 may be implemented by the FS 234 of FIG. 2.

The FS processing backend component 390 may be configured to perform further processing on the fragment data output by the FS streaming processors 380. For example, the FS processing backend component 390 may be configured to perform pixel post-processing. In some examples, one or more aspects of the FS processing backend component 390 may be implemented by the RB 236 of FIG. 2. Output of the FS processing backend component 390 may be stored in a memory, such as the unified cache 238 of FIG. 2.

In some examples, a streaming processor may be a fixed-function streaming processor configured to execute a respective shader program. For example, the VS streaming processors 340 may be fixed-function streaming processors configured to execute vertex shader programs and/or the FS streaming processors 380 may be fixed-function streaming processors configured to execute fragment shader programs.

In some examples, a streaming processor may be a programmable streaming processor that may be configured to execute one or more shader programs by loading the respective shader program to the programmable streaming processor. For example, the graphics processor 300 (and/or the CP 310) may load a vertex shader program to a first streaming processor (e.g., an SP0 340a, 380a) to cause the first streaming processor to execute the vertex shader program, may load a hull shader program to a second streaming processor (e.g., an SP1 340b, 380b) to cause the second streaming processor to execute the hull shader program, may load a domain shader program to a third streaming processor (e.g., an SP2 340c, 380c) to cause the third streaming processor to execute the domain shader program, may load a geometry shader program to a fourth streaming processor (e.g., an SP3 340d, 380d) to cause the fourth streaming processor to execute the geometry shader program, and/or may load a fragment shader program to the first streaming processor (e.g., the SP0 340a, 380a) to cause the first streaming processor to execute the fragment shader program. In some examples, a streaming processor that is capable of executing different shader programs may be referred to as a "unified streaming processor."

Thus, although shown as separate components in FIG. 3, in some examples, the VS streaming processors 340 and the FS streaming processor 380 may be implemented by the same streaming processors (e.g. unified streaming processors). For example, the GPU 300 (and/or the CP 310) may designate the streaming processors 340, 380 to perform different shading operations, such as vertex shading, hull shading, domain shading, geometry shading, fragment shading (sometimes referred to as "pixel shading"), etc., by sending commands to the streaming processors 340, 380 to execute one or more respective shader programs (sometimes referred to as "shaders"). The shader programs may include one or more instructions that control the operation of the streaming processors 340, 380 within the graphics processor 300. Example shader programs include vertex shader programs that may be executed by one or more of the streaming processors 340, 380 to process received vertex data and attributes, hull shader programs that may be executed by one or more of the streaming processors 340, 380 to generate tessellation factors and/or control points, domain shader programs that may be executed by one or more of the streaming processors 340, 380 to create new vertices, geometry shader programs that may be executed by one or more of the streaming processors 340, 380 to receive a primitive defined by its vertex data and to further process the primitive (e.g., silhouette-edge detection, shadow volume extrusion, etc.), fragment shader programs that may be executed by one or more of the streaming processors 340, 380 to generate per-pixel data (e.g., color, texture blending, lighting model computation etc.), etc.

Furthermore, although shown as separate components in FIG. 3, in some examples, the VS HLSQ 330 and the FS HLSQ 370 may be implemented by the same HLSQ. For example, when the HLSQ receives a workload from a frontend component (e.g., a vertex workload from the geometry processing frontend component 320 and/or a fragment shader workload from the FS processing frontend component 360), the HLSQ may determine which streaming processors 340, 380 to distribute the respective workloads. In some such examples, when the HLSQ receives a vertex workload, the HLSQ may be referred to as the VS HLSQ 330 and/or when the HLSQ receives a fragment shader workload, the HLSQ may be referred to as the FS HLSQ 370.

In some examples, the HLSQ may distribute a workload to a fixed-function streaming processor and/or to a unified streaming processor. For example, in some examples, the HLSQ may distribute a vertex workload to a fixed-function streaming processor configured to execute vertex shader programs to process the vertex workload. In some examples, the HLSQ may distribute a vertex workload to a unified streaming processor and may also load a vertex shader program to the unified streaming processor to cause the unified streaming processor to process the vertex workload by executing the vertex shader program.

Figure 4:
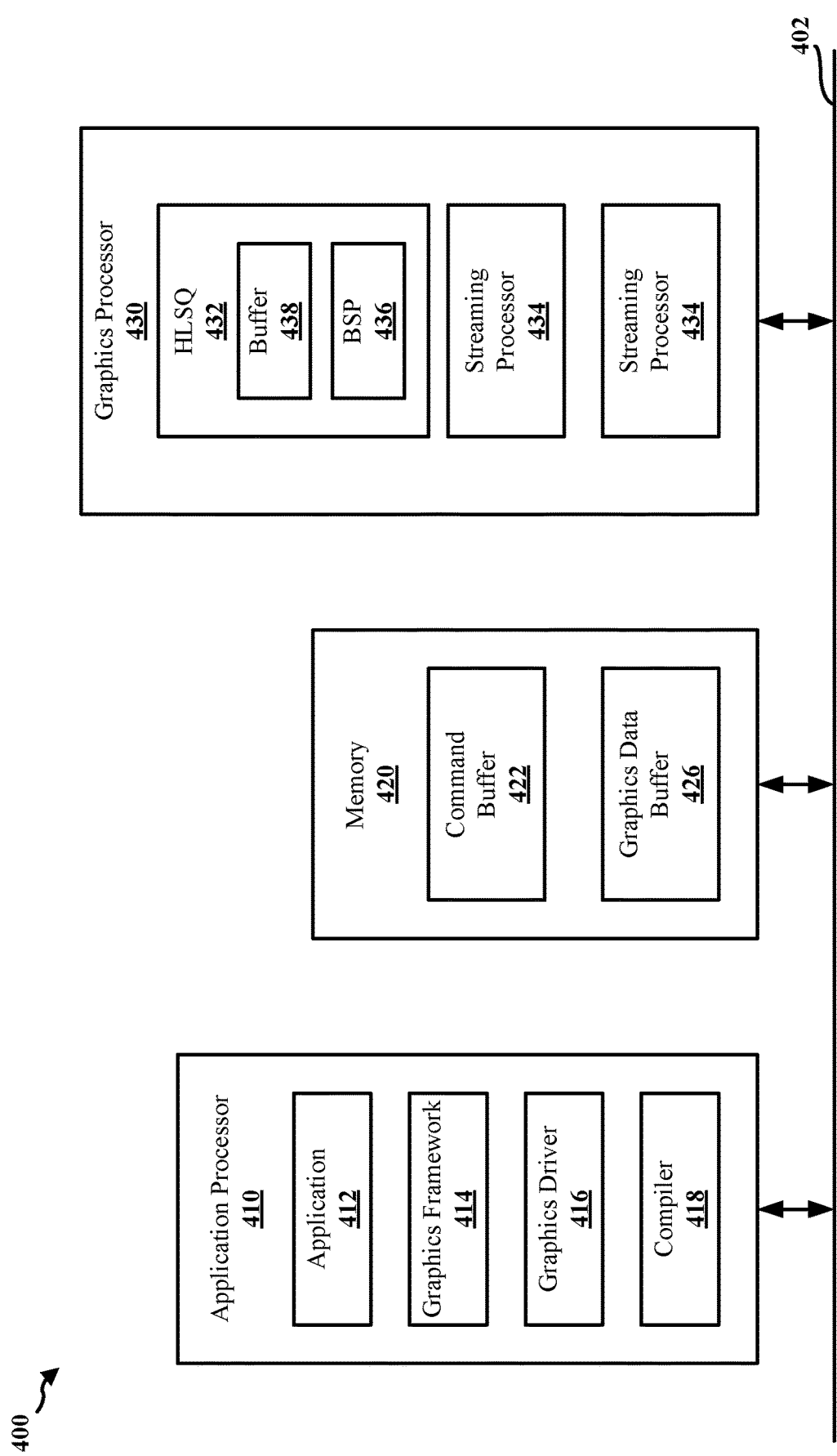
FIG. 4 is a block diagram illustrating components of a device of FIG. 1, in accordance with one or more techniques of this disclosure.

FIG. 4 is a block diagram 400 illustrating components of the device 104 of FIG. 1, in accordance with aspects of this disclosure. In the illustrated example of FIG. 4, the block diagram 400 includes an application processor 410, memory 420, and a graphics processor 430. In some examples, one or more aspects of the application processor 410 and/or the graphics processor 430 may be implemented by the example processing unit 120 of FIG. 1. In some examples, one or more aspects of the memory 420 may be implemented by the memory 124 and/or the internal memory 121 of FIG. 1. As shown in FIG. 4, the example application processor 410, the example memory 420, and the example graphics processor 430 are in communication via an example bus 402. The example bus 402 may be implemented using any combination of bus structures and/or bus protocols.

In the illustrated example of FIG. 4, the application processor 410 may include one or more processors that are configured to execute an application 412, a graphics framework 414, a graphics driver 416, and a compiler 418. The example memory 430 of FIG. 4 may be configured to store a command buffer 422 and a graphics data buffer 424. In the illustrated example of FIG. 4, the graphics processor 430 may include one or more processors that are configured to execute a high-level sequencer (HLSQ) 432 and one or more streaming processors 434.

In some examples, the application processor 410 may be configured to execute instructions that cause the application processor 410 to perform one or more of the example techniques disclosed herein. In some examples, the memory 420 may store instructions that, when executed, cause the application processor 410 and/or the graphics processor 430 to perform one or more of the example techniques disclosed herein. In some examples, the graphics processor 430 may be configured to execute instructions that cause the graphics processor 430 to perform one or more of the example techniques disclosed herein.

In the illustrated example, the application processor 410 may be configured to execute the application 412. The application 412 may be an application (e.g., a graphics application) that offloads the performing of graphics tasks (e.g., a draw command) to the graphics processor 430. For example, the application 412 may issue instructions that cause the graphics processor 430 to execute processing the graphics task. In some examples, the application 412 may store data used for the processing of the graphics tasks in the graphics data buffer 424 of the memory 420. For example, the application 412 may store attributes for a work item (e.g., a pixel, a vertex, etc.) at the graphics data buffer 424.

In the illustrated example, the graphics framework 414 may include one or more software frameworks that may be used with the application 412. In some examples, the graphics framework 414 may translate the instructions received from the application 412 into a format that is consumable by the graphics driver 416 for providing to the graphics processor 430. In some examples, the graphics framework 414 may include one or more application program interfaces (APIs). Examples of the graphics framework 414 may include the OPENGL API, the OPENGL ES API, the DIRECTX API, and other graphics frameworks. In some examples, an operating system executing on the application processor 410 may provide the graphics framework 414 to the application 412.

The graphics driver 416 receives instructions from the application 412, via the graphics framework 414, and controls the operation of the graphics processor 430 to execute the instructions. For example, the graphics driver 416 may generate one or more command streams, store the generated command streams in the command buffer 422 of the memory 420, and instruct the graphics processor 430 to execute the command streams. In some examples, the graphics driver 416 may communicate with the graphics processor 430 via one or more system calls of an operating system executing on the application processor 410.

The compiler 418 may be configured to compile one or more shader programs to be sent to and executed by the graphics processor 430. The shader programs may represent the software and/or firmware executed by the graphics processor 430 for implementing a pipeline, such as the graphics processing pipeline 107 and/or the compute processing pipeline 108 of FIG. 1. In some examples, the compiler 418 may pre-compile a shader program and store the pre-compiled shader program at the memory 420. In some examples, the compiler 418 may compile a shader program during runtime (e.g., during execution of the application 412).

In the illustrated example, the memory 420 includes the command buffer 422 and the graphics data buffer 424. The command buffer 422 may be configured to record one or more commands and/or shader programs received from the application processor 410. The example graphics data buffer 434 may be configured to store data generated by the application 412 and that may be used by the graphics processor 430 during processing of a graphics task. In some examples, the graphics data buffer 434 may include a plurality of different constant buffers generated by the application 412. For examples, a graphics task may include a transformation of an object (e.g., a pixel or a vertex). To facilitate the performing of the transformation, the application 412 may generate a first buffer storing constant data related to different colors, may generate a second buffer storing constant data related to different shapes, may generate a third buffer storing constant data related to different angles, etc. In some such examples, the application 412 may store the one or more different buffers at the graphics data buffer 434. The graphics processor 430 may read data stored at the graphics data buffer 434 to execute a graphics task and may also store output data generated by the executing of the graphics task in the graphics data buffer 434. It should be appreciated that in some examples, the application processor 410 may read the output data generated by the graphics processor 430 and stored in the graphics data buffer 434.

In the illustrated example, the graphics processor 430 includes the HLSQ 432 to receive a workload associated with a graphics task and to distribute the workload to one or more streaming processors 434 of the graphics processor 430. In some examples, the HLSQ 432 prepares the context state and resources for the streaming processors 434. For example, the HLSQ 432 may set a streaming processor 434 to a global register context state, to a shader constant context state, to a buffer descriptor context state, to an instruction context state, etc.

In the illustrated example, the streaming processors 434 may include one or more processing elements, such as one or more arithmetic logic units (ALUs), one or more elementary logic units (EFUs), one or more full-precision ALUs (FALUs), and/or one or more half-precision ALUs (HALUs). In some examples, the streaming processors 434 may be a programmable streaming processor of a fixed-function streaming processor. Although the illustrated example of FIG. 4 includes two streaming processors, in additional or alternative examples, the graphics processor 430 may include other suitable quantities of streaming processors.

A programmable streaming processor may include, for example, a programmable shader unit that is configured to execute one or more shader programs that are downloaded onto the graphics processor 430 (e.g., from the application processor 410 and/or the memory 420). In some examples, a shader program may be a compiled version of a program written in a shading language. In some examples, the programmable shader units may include vertex shader units, fragment shader units, compute shader units, etc.

A fixed-function streaming processor may include hardware that is hard-wired to perform certain functions. In some examples, the fixed-function streaming processor may additionally or alternatively include freely programmable shader-controlled pipelines that may enable the fixed-function streaming processor to perform some configurable functions. Although the fixed-function streaming processors may be configurable to perform different functions (e.g., via one or more control signals), the fixed-function hardware may not include a program memory that is capable of receiving user-compiled programs (e.g., from the application processor 410).

It should be appreciated that the streaming processors 434 allow for parallelization, which is at least one reason why executing graphics tasks via the graphics processor 430 may be useful. For example, each streaming processor 434 of the graphics processor 430 may be configured to execute the same operations, but on different data. In this way, the parallel-processing structure of the streaming processors 434 allows the graphics processor 430 to perform many operations in parallel (e.g., at the same time), which may be useful in processing graphics tasks.

During execution, graphics applications (e.g., the application 412) may create a plurality of buffers that may be used for the processing of an object (e.g., a graphics task). In some examples, the buffers may store constant data. For example, a graphics processor 430 executing a transformation task may include accessing different buffers storing constant data related to different shapes, to different colors, to different angles, etc. The different types of constant data may be stored in different constant buffers. However, to process the object, the graphics processor 430 may not need all of the data in the different constant buffers.

To improve processing of an object, some techniques employ a binding mechanism to assign (or "bind") resources to the processing of a particular object. For example, for a first object, a binding mechanism may include selecting a first subset of data from a first buffer, selecting a second subset of data from a second buffer, and then concatenating the first subset of data and the second subset of data into a third buffer. In some such examples, the third buffer may be available to the graphics processor 430 for processing the first object.

In some examples, the binding mechanism may be performed by the graphics driver 416 of the application processor 410. In some such examples, the graphics driver 416 may command the graphics processor 430 to perform the binding mechanism by providing the graphics processor 430 the locations of the subsets of data and the locations for storing the third buffer. However, it should be appreciated that the performing of the binding mechanism by the graphics driver 416 is limited to instances in which the subsets of data is static and, thus, the graphics processor 430 is able to provide the locations of the subsets of data.

Figure 5:
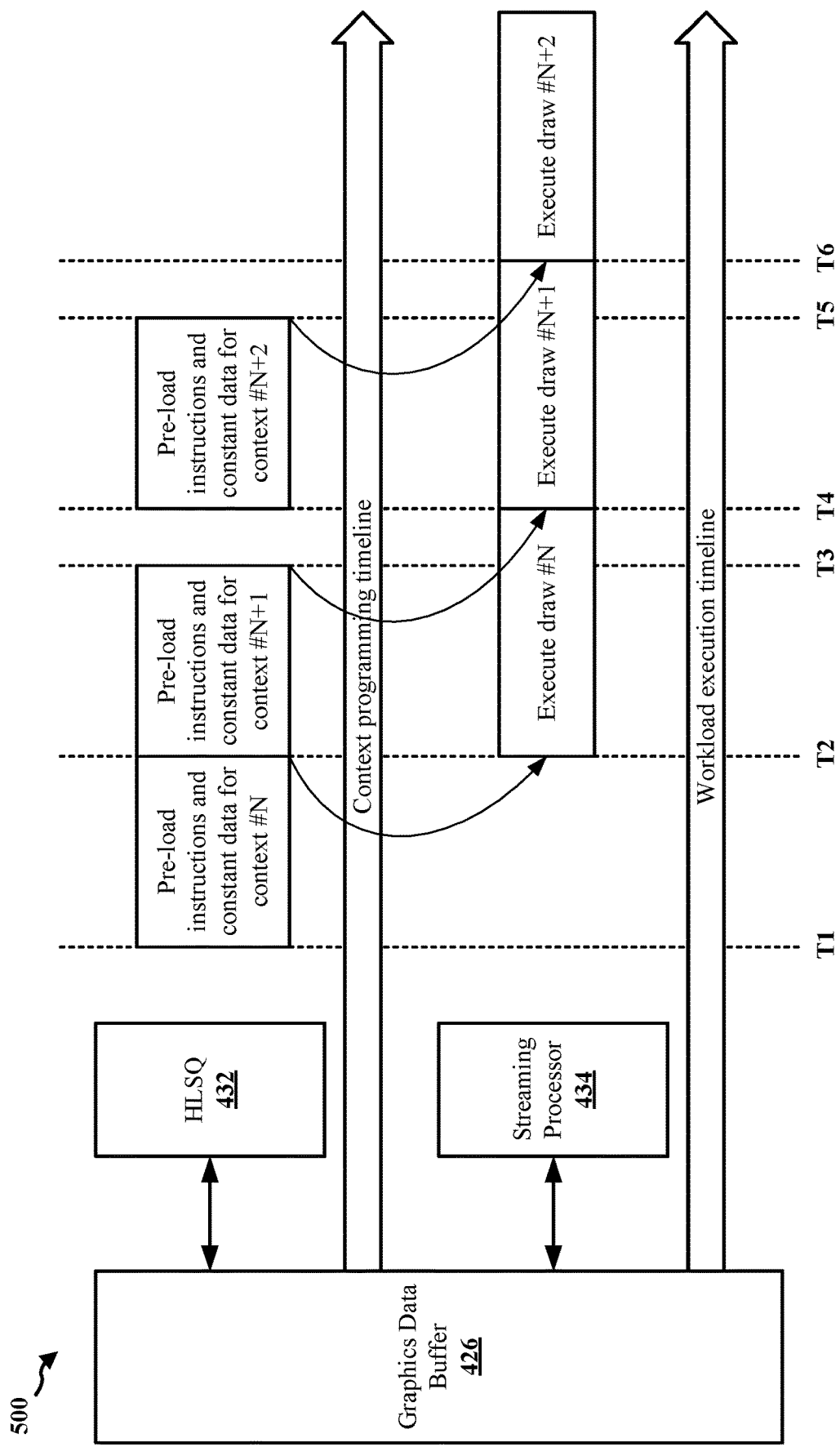
FIG. 5 illustrates an example timeline depicting the processing of a sequence of workloads by a graphics processor of FIG. 4, in accordance with one or more techniques of this disclosure.

FIG. 5 illustrates an example timeline 500 depicting the processing of a sequence of workloads by the graphics processor 430 of FIG. 4, in accordance with one or more techniques of this disclosure. In the illustrated example, the HLSQ 432 receives workloads for a series of context states (e.g., a context state #N, a context state #N+1, and a context state #N+2). The HLSQ 432 processes the respective workloads and pre-loads the instructions and constant data for the respective context states based on, for example, the commands associated with the binding mechanism employed by a graphics driver. For example, at time T1, the HLSQ 432 pre-loads the instructions and constant data for the context state #N, at time T2, the HLSQ 432 pre-loads the instructions and constant data for the context state #N+1, and at time T4, the HLSQ 432 pre-loads the instructions and constant data for the context state #N+2. The HLSQ 432 may pre-load instructions and constant data for the respective context states from the graphics data buffer 426 to a buffer of the HLSQ 432. After the resources (e.g., the instructions and constant data) for a context state are loaded, the HLSQ 432 may broadcast (e.g., distribute) the resources to one or more the streaming processors 434 to facilitate executing the respective workloads. For example, after the pre-loading of the resources context state #N is complete at time T2, the HLSQ 432 may broadcast the resources to the streaming processor 434, which may then begin executing the workload for the context state #N (e.g., a draw command).

As shown in FIG. 5, after the streaming processor 434 begins executing the workload for a context state, the HLSQ 432 may begin pre-loading the resources for the next context state. For example, even though the HLSQ 432 completes the pre-loading of the resources for the context state #N+1 at time T3, the HLSQ 432 waits until the streaming processor 434 begins executing the workload for the context state #N+1 (at time T4) to begin pre-loading the resources for the context state #N+2. It should be appreciated that, as shown in FIG. 5, the HLSQ 432 processes the resources for a workload prior to the streaming processor 434 and, thus, the streaming processor 434 is able to start processing the workload as soon as the resources are ready. Moreover, it should be appreciated that the processing elements of the streaming processor 434 may be continuously utilized for the executing of the workload.

Referring again to FIG. 4, as applications evolved, control of the resources for processing a workload shifted from the graphics driver 416 to the application 412. By enabling the application 412 to handle resource control, resources may be dynamically assigned during runtime of the application. For example, bindless resources may be requested at runtime by the graphics processor 430 and are not assigned (or bound) to the processing of a particular object, as described above with respect to the binding mechanism. That is, in contrast to a binding mechanism, employing a "bindless mechanism" enables the resources to be dynamically assigned. For example, the subset of data to select from a buffer for the processing of a current workload may depend on the processing of a previous workload. As a result, the graphics driver 416 may be unable to provide the locations to the graphics processor 430 for the subsets of data to concatenate.

However, the compiler 418 can compile a shader program to enable the dynamic binding of resources. For example, the compiler 418 may determine that the application 412 may instruct a load operation for a concatenated buffer, but may be unable to identify which subsets of data to use for the binding of resources (e.g., the subsets of data may be dynamically determined during runtime). In some such examples, the compiler 418 may compile a shader program to include a preamble section that provides instructions for binding resources during runtime. For example, a shader program preamble may include a first instruction to load a first subset of data from a first buffer, may include a second instruction to load a second subset of data from a second buffer, and may include a third instruction to concatenate and store the first and second subsets of data in a constant buffer of a streaming processor. A streaming processor, when executing the shader program, may first execute the shader program preamble to obtain the constant data associated with the shader program, and, once the constant data is loaded, may then execute the main instructions section of the shader program.

Figure 6:
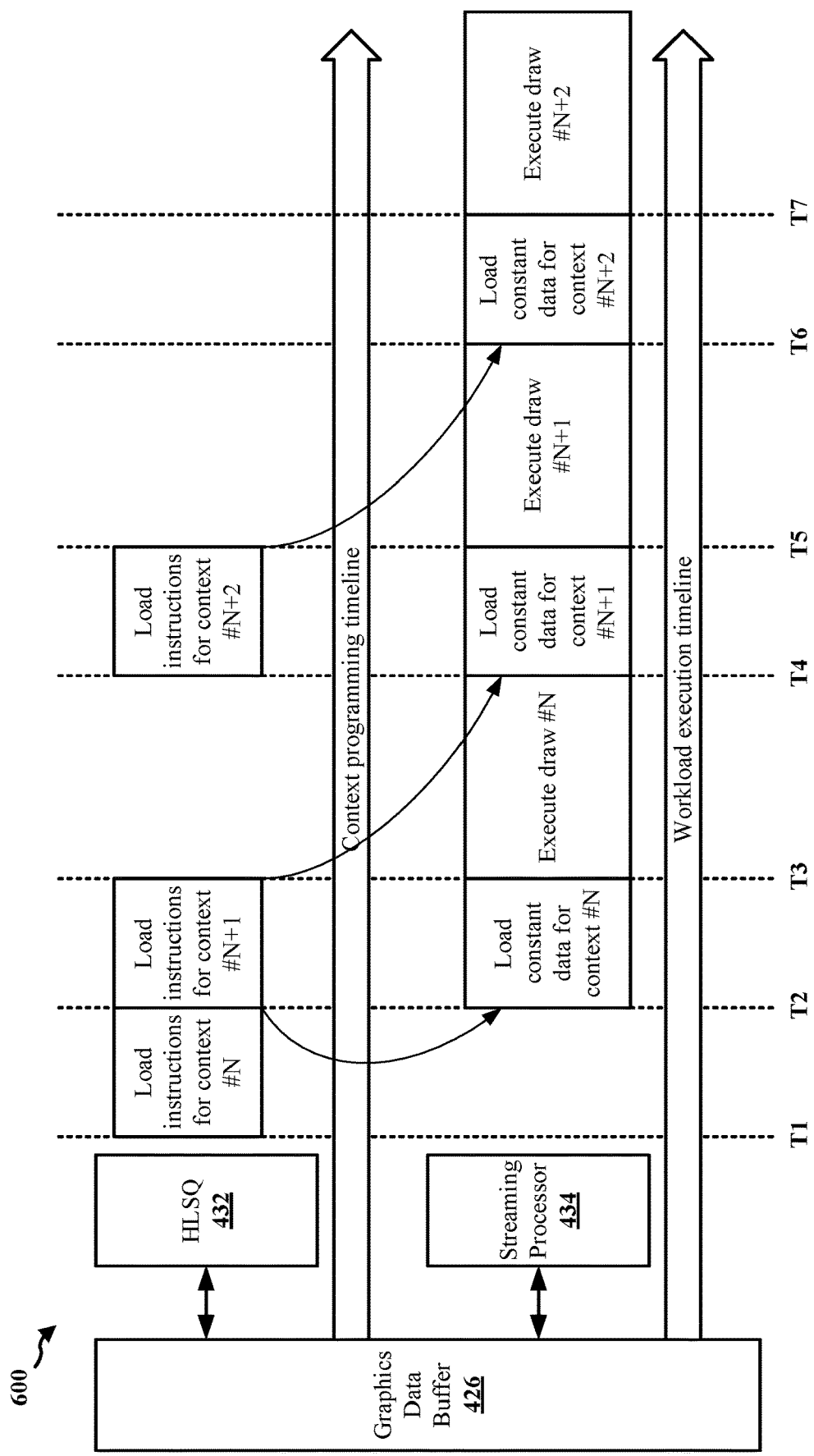
FIG. 6 illustrates another example timeline depicting the processing of a sequence of workloads by a graphics processor of FIG. 4, in accordance with one or more techniques of this disclosure.

FIG. 6 illustrates another example timeline 600 depicting the processing of a sequence of workloads by the graphics processor 430 of FIG. 4, in accordance with one or more techniques of this disclosure. In the illustrated example of FIG. 6, the HLSQ 432 loads instructions for a context state from the graphics data buffer 426 of the memory 420. The HLSQ 432 may then provide the instructions for the context state to respective ones of the streaming processors. In the illustrated example, the instructions loaded by the HLSQ 432 may represent a shader program including a shader program preamble and a main instructions section of the shader program. As shown in FIG. 6, the streaming processor 434 may then execute the instructions of the shader program preamble to load the constant data and then execute the main instructions section of the shader program.

For example, in the illustrated example of FIG. 6, at time T1, the HLSQ 432 loads instructions for the context state #N, load instructions for the context state #N+1 at time T2, and loads instructions for the context state #N+2 at time T4. After the instructions for a context state are loaded, the HLSQ 432 may broadcast (e.g., distribute) the instructions to one or more of the streaming processors to facilitate executing the respective workloads. For example, after completing the loading of the instructions for context state #N, the HLSQ 432 broadcasts the instructions (e.g., a shader program including a preamble section and a main instructions section) to the streaming processor 434 at time T2. The streaming processor 434 then executes the instructions of the preamble section of the received instructions (e.g., of the shader program) to load the constant data for context state #N between time T2 and time T3. After the constant data is loaded (at time T3), the streaming processor 434 may then begin executing the main instructions section of the received instructions (e.g., of the shader program) to facilitate executing the workload for the context state #N (e.g., a draw command).

As shown in FIG. 6, after the streaming processor 434 begins executing the instructions of the preamble section of the received instructions for a context state, the HLSQ 432 may begin loading the instructions (e.g., the shader program) for the next context state. For example, the HLSQ 432 loads the instructions for context state #N+1 between time T2 and time T3, which is when the streaming processor 434 is executing the instructions of the preamble section of the shader program of context state #N to load the constant data for the context state #N. Similarly, the HLSQ 432 waits to load the instructions for context state #N+2 (e.g., the shader program for context state #N+2) until the streaming processor 434 begins executing the instructions of the preamble section of the shader program of context state #N+1 to load the constant data for the context state #N+1 at time T4.

The aforementioned aspects of employing a preamble section of a shader program (as shown in FIG. 6) can include a number of different advantages. For example, the streaming processor may load the constant data from the graphics data buffer 424 to a constant buffer of the streaming processor. Loading the constant data from the graphics data buffer 424 to the constant buffer of the streaming processor 434 may be more processing and/or memory bandwidth efficient than loading the constant data from the graphics data buffer 424 to a buffer of the HLSQ 432 and then from the buffer of the HLSQ 432 to the constant buffer of the streaming processor 434. Furthermore, including the instructions to load the subsets of constant data in the preamble section of the shader program, rather than in the main instructions section of the shader program, may allow the constant data to be loaded from the graphics data buffer 424 once per graphics task (e.g., once per draw command), rather than once per work item (e.g., once per pixel or once per vertex), which may facilitate improving processing and/or memory bandwidth efficiency.

However, as shown in FIG. 6, employing the streaming processor 434 to execute the instructions of the preamble section and the main instructions section of the shader program results in the serialized processing of the constant data and the workload. For example, the streaming processor 434 executes the instructions of the preamble section of the shader program for context state #N between time T2 and time T3, then executes the main instructions section of the shader program for context state #N between time T3 and time T4, then executes the instructions of the preamble section of the shader program for context state #N+1 between time T4 and time T5, then executes the main instructions section of the shader program for context state #N+1 between time T5 and time T6, then executes the instructions of the preamble section of the shader program for context state #N+2 between time T6 and time T7, then executes the main instructions section of the shader program for context state #N+2 at time T7, etc.

Furthermore, the loading of the constant data for a context state may not be a resource intensive task. For example, the executing of the instructions of the preamble section may be performed by a subset of processing elements (e.g., one processing element) of the streaming processor 434. In some such examples, the remaining processing elements of the streaming processor 434 may be idle, which may result in underutilized resources of the graphics processor 430.

Referring again to FIG. 4, to improve the processing of bindless resources (e.g., resources requested at runtime), the example HLSQ 432 includes a bindless state processor 436 that is configured to operate on one work item at a time (e.g., a scalar processor). In some examples, the bindless state processor (BSP) 436 may be a processor dedicated to the executing of instructions to load bindless resources. For example, the BSP 436 may be dedicated to the processing of preamble sections and execute the instructions of a preamble section of a shader program to load the constant data for a respective context state. The BSP 436 may load the constant data from the graphics data buffer 426 and may store the constant data in a buffer 438 of the HLSQ 432. After the BSP 436 completes executing the instructions of the preamble section and stores the respective constant data at the buffer 438, the HLSQ 432 may then broadcast (e.g., distribute) the constant data and the main instructions section of the shader program to the one or more streaming processors 434.

In the illustrated example, the BSP 436 is a processor configured to execute instructions for the processing of the preamble section of a shader program. In particular, the BSP 436 may implement the same instruction set architecture (ISA) as the streaming processor 434. The ISA generally defines instructions and/or operations that processing circuitry can parse and execute. In some examples, the ISA may be a form of machine-language instructions that are specific to the processing circuitry (e.g., that are specific to the BSP 436 and the streaming processor 434). By employing the same ISA at the BSP 436 and the streaming processor 434, the instructions of the shader program preamble may be executed during runtime by the BSP 436 or the streaming processor 436. For example, in some examples, the BSP 436 may execute the instructions of the shader program preamble, and in other examples, the streaming processor 434 may execute the instructions of the shader program preamble. In some examples, a shader program may include an indicator (e.g., a flag or a bit) to indicate whether the BSP 436 or the streaming processor 434 is to execute the instructions of the shader program preamble. However, it should be appreciated that other techniques for indicating whether the BSP 436 or the streaming processor 434 is to execute the instructions of the shader program preamble may additionally or alternatively be used.

In some examples, while the BSP 436 and the streaming processor 434 may implement the same ISA, the BSP 436 may be configured to execute a subset of functions of the streaming processor 434. For example, the BSP 436 may be configured to execute functions related to the processing of preamble sections and the streaming processor 434 may be configured to execute functions related to the processing of preamble sections and the processing of main instructions sections.

As described above, the preamble section of the shader program may be executed once per graphics task (e.g., once per draw command or once for a context state), while the main instructions section of the shader program may be executed once per work item (e.g., once per pixel, once per vertex, etc.). In this manner, the loading of the constant data by the BSP 436 may be executed at a lower frequency than the executing of the instructions of the main instructions section by the streaming processor 434.

Figure 7:
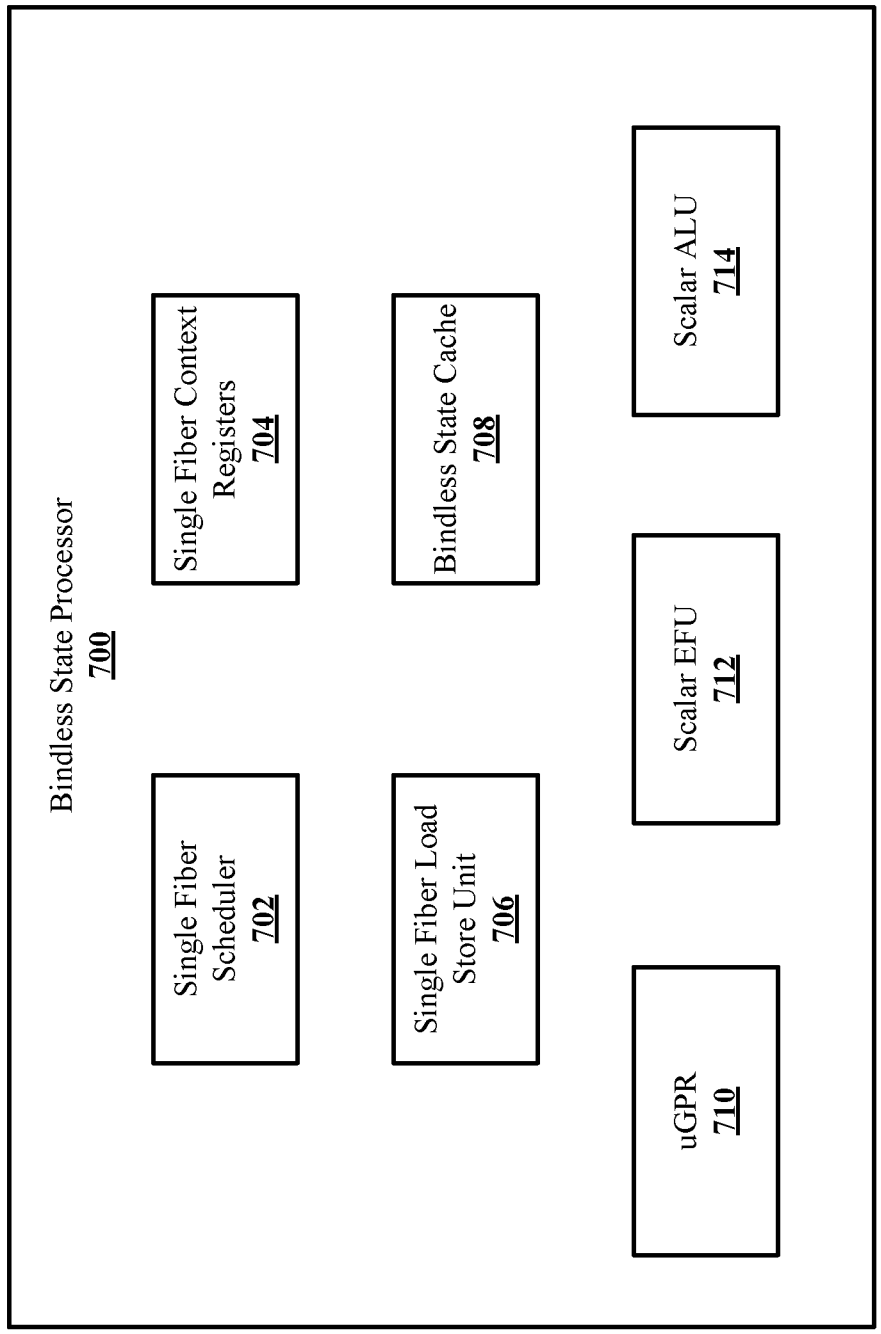
FIG. 7 is a block diagram illustrating components of a bindless state processor of FIG. 4, in accordance with one or more techniques of this disclosure.

FIG. 7 is a block diagram of a bindless state processor (BSP) 700, in accordance with aspects of this disclosure. In the illustrated example, the BSP 700 may be any type of processor that is configured to operate on one work item at a time. For example, the BSP 700 may be a scalar processor. One or more aspects of the BSP 700 may be implemented by the BSP 436 of FIG. 4. In the illustrated example of FIG. 7, the BSP 700 includes a single fiber scheduler 702, single fiber context registers 704, a single fiber load store unit 706, a bindless state cache 708, a uniform general purpose register (uGPR) 710, a scalar EFU 712, and a scalar ALU 714.

In the illustrated example, the single fiber scheduler 702 is configured to process different shader program preambles. For example, the single fiber scheduler 702 may be configured to process vertex shader program preambles, fragment (or pixel) shader program preambles, geometry shader program preambles, domain shader program preambles, hull shader program preambles, compute shader program preambles, etc. In some examples, the single fiber scheduler 702 may be configured to control execution of the scalar EFU 712 and/or the scalar ALU 714 by, for example, instructing the scalar EFU 712 and/or the scalar ALU 714 which function to perform. For example, the single fiber scheduler 702 may facilitate scheduling and managing execution of instructions of a fiber by the scalar EFU 712 and/or the scalar ALU 714. In some examples, the single fiber scheduler 702 may be configured to fetch instructions from the buffer 438 of the HLSQ 432 and/or the bindless state cache 708, decode each instruction (if necessary), fetch operand(s) (if necessary) for executing the instruction, and perform flow control for the single fiber scheduler 702.

In the illustrated example, the single fiber context registers 704 is configured to enable flow control within the BSP 700. In some examples, the single fiber context registers 704 may include an address register, a predicate register, etc. to facilitate flow control.

In the illustrated example, the single fiber load store unit 706 is configured to control the loading of instructions and/or data to and from the BSP 700. For example, the single fiber load store unit 706 may interface with the graphics data buffer 426 of the memory 420 and/or the buffer 438 of the HLSQ 432 and load instructions to the bindless state cache 708 of the BSP 700. The single fiber load store unit 706 may also interface with the graphics data buffer 426 and load data from the graphics data buffer 426 to the memories (e.g., the bindless state cache 708 and/or the uGPR 710) of the BSP 700. The single fiber load store unit 706 may also write data to the buffer 438. For example, the single fiber load store unit 706 may fetch, from the graphics data buffer 426, constant data generated by the execution of the shader program preamble and store the fetched constant data at the buffer 438.

In the illustrated example, the bindless state cache 708 is a memory that is accessible by the scalar EFU 712 and the scalar ALU 714. In the illustrated example, the bindless state cache 708 is configured to store data that is accessible to the scalar EFU 712 and/or the scalar ALU 714 executing a fiber.

In the illustrated example, the uGPR 710 is a memory that is accessible to respective components of the BSP 700. In the illustrated example, the uGPR 710 includes scalar registers for storing one element at a time. The uGPR 710 may store output data generated by the scalar EFU 712 and/or the scalar ALU 714, and may additionally or alternatively store input data that is provided to the BSP 700 for processing (e.g., an operand for performing arithmetic functions). In the illustrated example, the uGPR 710 is configured to store data that is accessible to the BSP 700 executing a fiber. For example, the uGPR 710 may store input data used by the scalar EFU 712 and/or the scalar ALU 714 to execute a fiber, may store intermediate results generated by the scalar EFU 712 and/or the scalar ALU 714 during execution of a fiber, and/or may store output data generated by the execution of the fiber.

In the illustrated example of FIG. 7, the scalar EFU 712 and the scalar ALU 714 may be execution units configured to perform operations on a single slice of data. The scalar EFU 712 and/or the scalar ALU 714 may perform arithmetic operations (e.g., addition, subtraction, multiplication, division, etc.), logic operations (e.g., logic AND operations, logic OR operations, logic XOR operations, etc.), comparison operations (e.g., greater than operations function, less than operations, equal to zero operations, etc.), etc. The scalar EFU 712 and the scalar ALU 714 may perform (or execute) an operation based on an instruction received from the single fiber scheduler 702. The instruction may include an operation identifier identifying an operation to perform, operand(s) for executing the operation, and a destination for storing the output of executing the operation. The scalar EFU 712 and the scalar ALU 714 may be configured to operate on one component (or attribute) at a time.

Figure 8:
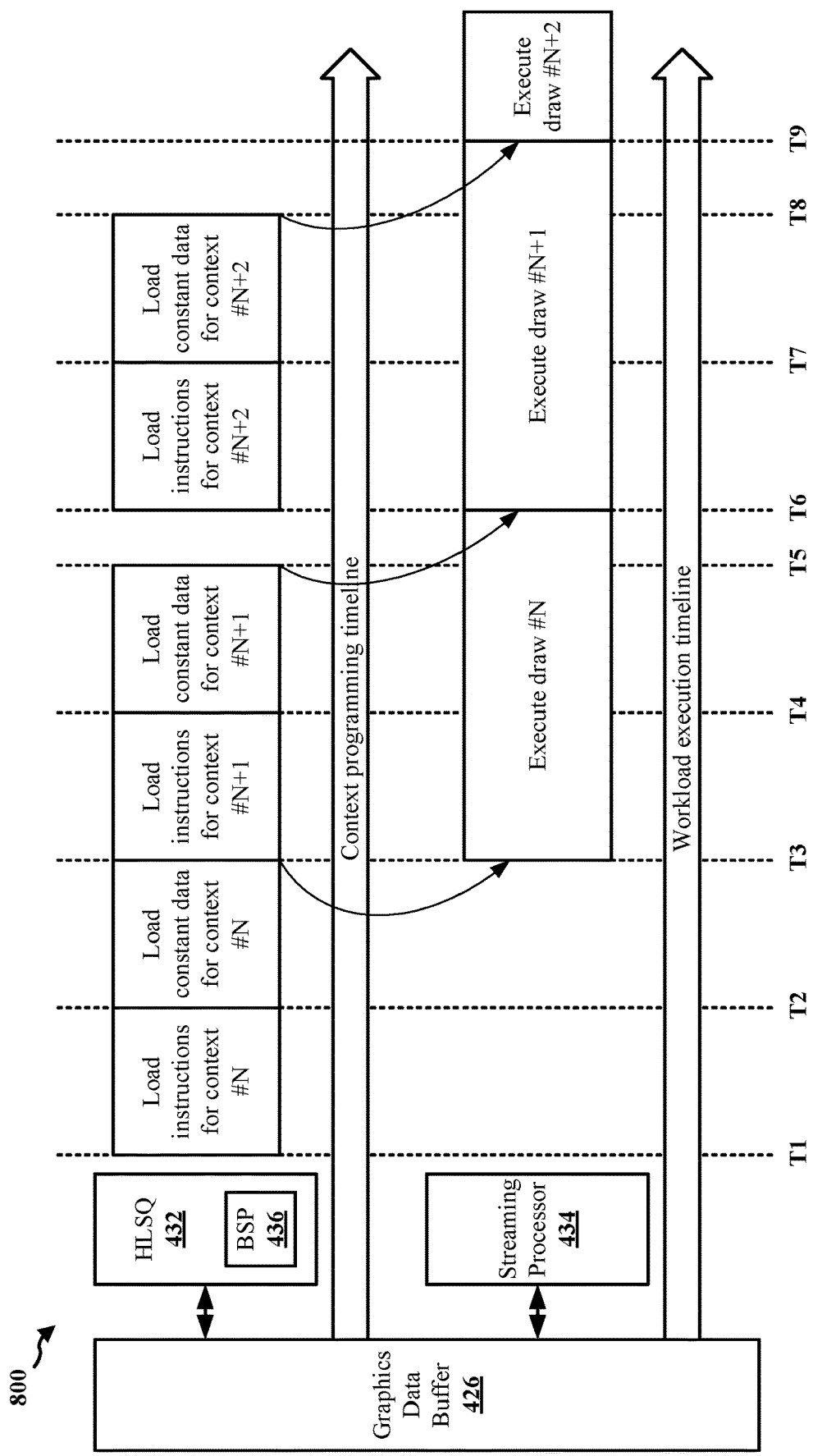
FIG. 8 illustrates another example timeline depicting the processing of a sequence of workloads by a graphics processor of FIG. 4, in accordance with one or more techniques of this disclosure.

FIG. 8 illustrates another example timeline 800 depicting the processing of a sequence of workloads by the graphics processor 430 of FIG. 4, in accordance with one or more techniques of this disclosure. In the illustrated example of FIG. 8, the HLSQ 432 loads instructions for a context state from the graphics data buffer 426 of the memory 420. In the illustrated example, the instructions loaded by the HLSQ 432 may represent a shader program including a shader program preamble and a main instructions section of the shader program. The BSP 436 may then execute the instructions of the shader program preamble to facilitate loading constant data from the graphics data buffer 426 to the buffer 438 of the HLSQ 432. The HLSQ 432 may then provide the loaded resources (e.g., the loaded instructions of the shader program and the constant data) to respective ones of the streaming processors for processing. As shown in FIG. 8, the HLSQ 432 and the BSP 436 facilitate loading the resources of a workload and then providing the resources to the streaming processor 434 for processing.

For example, at time T1, the HLSQ 432 loads instructions (e.g., a shader program including a preamble section and a main instructions section) for the context state #N. At time T2, the BSP 436 may execute the instructions of the preamble section of the shader program and load the constant data for the context state #N. For example, the BSP 436 may load the constant data from the graphics data buffer 426 and store the constant data at the buffer 438 of the HLSQ 432. After the constant data is loaded, then at time T3, the HLSQ 432 may broadcast (e.g., distribute) the resources for the context state #N to the streaming processor 434. For example, the HLSQ 432 may provide the main instructions section of the shader program and the constant data for the context state #N to the streaming processor 434. At time T3 (or shortly thereafter), the steaming processor 434 may begin executing the workload for the context state #N (e.g., a draw command) using the received main instructions section of the shader program and the constant data. The HLSQ 432 may also begin loading the instructions (e.g., a shader program including a preamble section and a main instructions section) for the context state #N+1.

At time T4, the BSP 436 may execute the instructions of the preamble section of the shader program and load the constant data for the context state #N+1. For example, the BSP 436 may load the constant data from the graphics data buffer 426 and store the constant data at the buffer 438 of the HLSQ 432. In the illustrated example, after the constant data is loaded (at time T5), the HLSQ 432 waits for the streaming processor 434 to finish executing the workload for the context state #N before broadcasting the resources for the context state #N+1 (at time T6). For example, the HLSQ 432 may provide the main instructions section of the shader program and the constant data for the context state #N+1 to the streaming processor 434. At time T6 (or shortly thereafter), the steaming processor 434 may begin executing the workload for the context state #N+1 (e.g., a draw command) using the received main instructions section of the shader program and the constant data. The HLSQ 432 may also begin loading the instructions (e.g., a shader program including a preamble section and a main instructions section) for the context state #N+2.

At time T7, the BSP 436 may execute the instructions of the preamble section of the shader program and load the constant data for the context state #N+2. For example, the BSP 436 may load the constant data from the graphics data buffer 426 and store the constant data at the buffer 438 of the HLSQ 432. In the illustrated example, after the constant data is loaded (at time T8), the HLSQ 432 waits for the streaming processor 434 to finish executing the workload for the context state #N+1 before broadcasting the resources for the context state #N+2 (at time T9). For example, the HLSQ 432 may provide the main instructions section of the shader program and the constant data for the context state #N+2 to the streaming processor 434. At time T9 (or shortly thereafter), the steaming processor 434 may begin executing the workload for the context state #N+2 (e.g., a draw command) using the received main instructions section of the shader program and the constant data.

The aforementioned aspects of employing a BSP 436 to facilitate executing the preamble section of a shader program can include a number of different advantages. For example, by providing the BSP 436 as a component of the HLSQ 432, the BSP 436 is able to facilitate efficiently loading bindless constant data for execution of a workload. For example, the executing of the shader program preamble by a dedicated bindless state processor enables the instructions of the shader program preamble to be efficiently executed and also avoids instances where the processing or memory bandwidth of the graphics processor 430 may not be efficiently utilized. The BSP 436 also allows the bindless constant data to be loaded early (e.g., before broadcasting resources to the streaming processor 434), which enables the HLSQ 432 and the BSP 436 to manage the state processing of the shader program and enable the streaming processor to perform the workload processing. Furthermore, by employing scalar and single fiber components, the BSP 436 may be a resource efficient addition to the graphics processor 430. For example, the physical area and the hardware costs of the BSP 436 may be relatively minimal. Additionally, because the BSP 436 and the streaming processor 432 employ the same ISA, the software cost of implementing the BSP 436 may also be relatively minimal.

Figure 9:
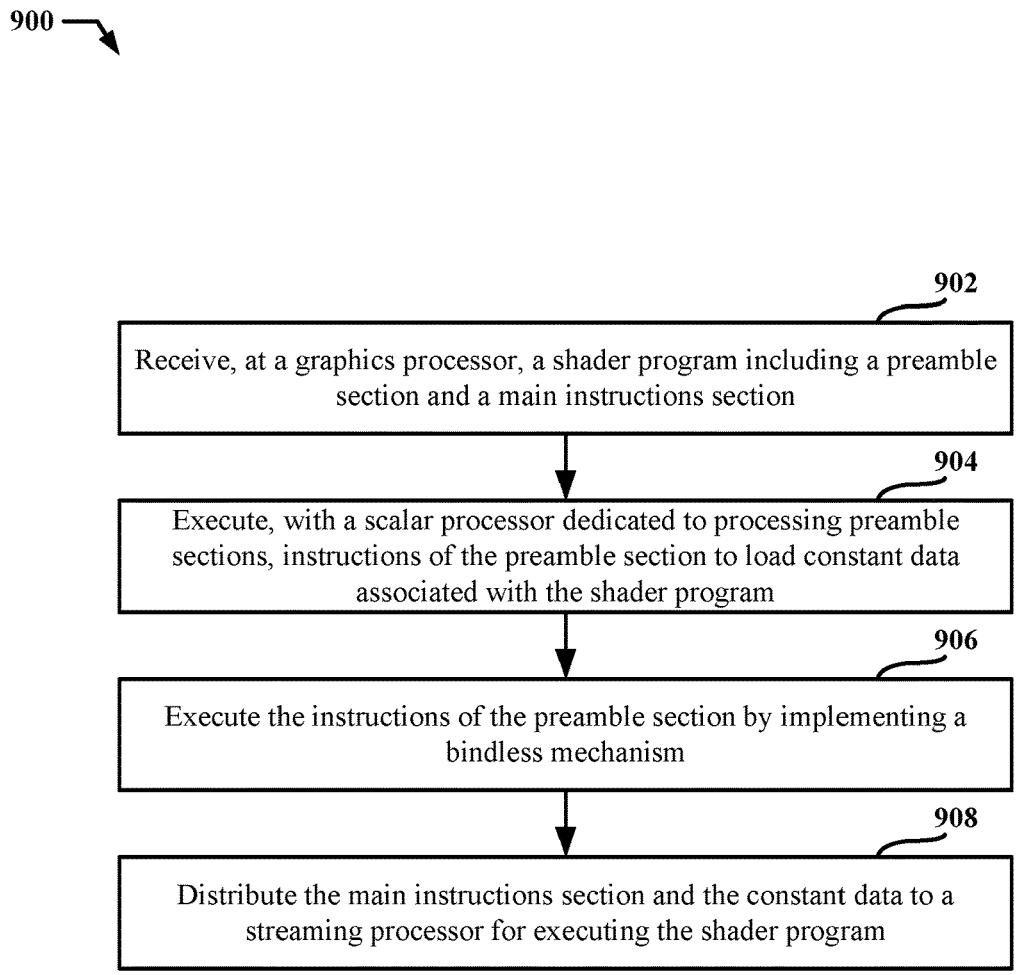
FIG. 9 is an example flowchart of an example method, in accordance with one or more techniques of this disclosure.

FIG. 9 illustrates an example flowchart 900 of an example method in accordance with one or more techniques of this disclosure. The method may be performed by an apparatus, such as the device 104 of FIG. 1, a graphics processor (e.g., a CPU, an application processor, a DPU, a display processor, a GPU, a video processor, and the like), and/or a component of the device 104, such as the processing unit 120 of FIG. 1.

At 902, the apparatus may receive, at a graphics processor, a shader program including a preamble section and a main instructions section, as described in connection with the examples of FIGS. 1 to 7 and/or 8. For example, the HLSQ 432 may load the shader program.

At 904, the apparatus may execute, with a scalar processor dedicated to processing preamble sections, instructions of the preamble section to load constant data associated with the shader program, as described in connection with the examples of FIGS. 1 to 7 and/or 8. For example, the BSP 436 may execute the instructions of the preamble section. In some examples, executing the instructions of the preamble section may include fetching the instructions of the preamble section from a buffer, decoding the instructions of the preamble section, fetching one or more operands for executing the instructions of the preamble section, performing flow control for the executing of the instructions of the preamble section, executing the instructions of the preamble section based on the flow control, and storing output data generated by the executing of the instructions of the preamble section at the buffer.

At 906, the apparatus may execute the instructions of the preamble section by implementing a bindless mechanism, as described in connection with the examples of FIGS. 1 to 7 and/or 8. For example, implementing the bindless mechanism may include loading a first subset of data from a first buffer, loading a second subset of data from a second buffer, and concatenating the first subset of data and the second subset of data into a third buffer.

At 908, the apparatus may distribute the main instructions section of the shader program and the constant data to a streaming processor for executing the shader program, as described in connection with the examples of FIGS. 1 to 7 and/or 8. For example, the HLSQ 432 may distribute the main instructions section and the constant data from the buffer 438 to the streaming processor 434 to execute the main instructions section of the shader program.

In one configuration, a method or apparatus for graphics processing is provided. The apparatus may be a processing unit, a GPU, an application processor, a CPU, a display processor, a display processing unit (DPU), a video processor, or some other processor that can perform graphics processing. In some examples, the apparatus may be the processing unit 120 within the device 104, or may be some other hardware within the device 104, or another device. The apparatus may include means for receiving, at a graphics processor, a shader program including a preamble section and a main instructions section. The apparatus may also include means for executing, with a scalar processor dedicated to processing preamble sections, instructions of the preamble section to implement a bindless mechanism for loading constant data associated with the shader program. The apparatus may also include means for distributing the main instructions and the constant data to a streaming processor for executing the shader program. The apparatus may also include means for employing a same instruction set architecture (ISA) at the scalar processor and the streaming processor. The apparatus may also include means for implementing the bindless mechanism during runtime. The apparatus may also include means for loading a first subset of data from a first buffer. The apparatus may also include means for loading a second subset of data from a second buffer. The apparatus may also include means for concatenating the first subset of data and the second subset of data into a third buffer.

The apparatus may also include means for fetching the instructions of the preamble section from a buffer. The apparatus may also include means for decoding the instructions of the preamble section. The apparatus may also include means for fetching one or more operands for executing the instructions of the preamble section. The apparatus may also include means for performing flow control for the executing of the instructions of the preamble section. The apparatus may also include means for executing the instructions of the preamble section based on the flow control. The apparatus may also include means for storing output data generated by the executing of the instructions of the preamble section at the buffer.

The subject matter described herein can be implemented to realize one or more benefits or advantages. For instance, the described graphics processing techniques can be used by a graphics processor (e.g., a GPU, an application processor, a CPU, a display processor, a DPU, a video processor, or some other processor that can perform graphics processing) to implement the improving of bindless state processing at a graphics processor, reduce the load of a processing unit (e.g., any processing unit configured to perform one or more techniques disclosed herein, such as a graphics processor), and/or reduce power consumption of the processing unit.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method for performing graphics processing, comprising:
   receiving, at a graphics processor, a shader program including a preamble section and a main instructions section;
   executing, with a scalar processor dedicated to processing preamble sections, instructions of the preamble section to implement a bindless mechanism for loading constant data associated with the shader program, wherein the bindless mechanism is configured to: (i) load a first subset of data from a first buffer, (ii) load a second subset of data from a second buffer, and (iii) concatenate the first subset of data and the second subset of data into a third buffer; and
   distributing the main instructions section and the constant data to a streaming processor for executing the shader program.

2. The method of claim 1, wherein the scalar processor and the streaming processor employ a same instruction set architecture (ISA).

3. The method of claim 1, wherein the shader program includes an indicator indicating whether the scalar processor or the streaming processor is to execute the instructions of the preamble section.

4. The method of claim 1, wherein the scalar processor is configured to execute a subset of functions of the streaming processor.

5. The method of claim 1, wherein the scalar processor is configured to implement the bindless mechanism during runtime.

6. The method of claim 1, wherein the third buffer includes the constant data.

7. The method of claim 1, wherein the executing of the instructions of the preamble section includes:
   fetching the instructions of the preamble section from a buffer;
   decoding the instructions of the preamble section;
   fetching one or more operands for executing the instructions of the preamble section;
   performing flow control for the executing of the instructions of the preamble section;
   executing the instructions of the preamble section based on the flow control; and
   storing output data generated by the executing of the instructions of the preamble section at the buffer.

8. An apparatus for performing graphics processing, comprising:
   a memory; and
   at least one processor coupled to the memory and configured to:
      receive, at a graphics processor, a shader program including a preamble section and a main instructions section;
      execute, with a scalar processor dedicated to processing preamble sections, instructions of the preamble section to implement a bindless mechanism for loading constant data associated with the shader program, wherein the bindless mechanism is configured to: (i) load a first subset of data from a first buffer, (ii) load a second subset of data from a second buffer, and (iii) concatenate the first subset of data and the second subset of data into a third buffer; and
      distribute the main instructions section and the constant data to a streaming processor for executing the shader program.

9. The apparatus of claim 8, wherein the scalar processor and the streaming processor employ a same instruction set architecture (ISA).

10. The apparatus of claim 8, wherein the shader program includes an indicator indicating whether the scalar processor or the streaming processor is to execute the instructions of the preamble section.

11. The apparatus of claim 8, wherein the scalar processor is configured to execute a subset of functions of the streaming processor.

12. The apparatus of claim 8, wherein the scalar processor is configured to include at least a single fiber scheduler, single fiber context registers, a single fiber load store unit, a bindless state cache, a uniform general purpose register, a scalar elementary functional unit, and a scalar arithmetic logic unit.

13. The apparatus of claim 8, wherein the scalar processor is configured to implement the bindless mechanism during runtime.

14. The apparatus of claim 8, wherein the third buffer includes the constant data.

15. The apparatus of claim 8, wherein the apparatus includes a wireless communication device.

16. A non-transitory computer-readable medium storing computer executable code for data graphics, comprising code to:
- receive, at a graphics processor, a shader program including a preamble section and a main instructions section;
- execute, with a scalar processor dedicated to processing preamble sections, instructions of the preamble section to implement a bindless mechanism for loading constant data associated with the shader program, wherein the bindless mechanism is configured to: (i) load a first subset of data from a first buffer, (ii) load a second subset of data from a second buffer, and (iii) concatenate the first subset of data and the second subset of data into a third buffer; and
- distribute the main instructions section and the constant data to a streaming processor for executing the shader program.

17. The non-transitory computer-readable medium of claim 16, further comprising code to employ a same instruction set architecture (ISA) at the scalar processor and the streaming processor.

18. The non-transitory computer-readable medium of claim 16, further comprising code to determine whether the scalar processor or the streaming processor is to execute the instructions of the preamble section based on an indicator of the shader program.

* * * * *